United States Patent [19]
Johnston

[11] Patent Number: 5,130,031
[45] Date of Patent: Jul. 14, 1992

[54] METHOD OF TREATING AQUEOUS LIQUIDS USING LIGHT ENERGY, ULTRASONIC ENERGY, AND A PHOTOCATALYST

[75] Inventor: Allan J. Johnston, Palo Alto, Calif.

[73] Assignee: SRI International, Menlo Park, Calif.

[21] Appl. No.: 608,997

[22] Filed: Nov. 1, 1990

[51] Int. Cl.$^5$ .............................. C02F 1/30; C02F 1/36
[52] U.S. Cl. .................................. 210/748; 210/763; 210/758
[58] Field of Search ............... 210/748, 762, 763, 764; 422/20, 22, 24, 186, 186.3, 187, 190, 191, 211

[56] References Cited

U.S. PATENT DOCUMENTS

| | | | |
|---|---|---|---|
| 2,717,874 | 9/1955 | Verain | 210/748 |
| 3,672,823 | 6/1972 | Boucher | 134/1 |
| 4,008,136 | 2/1977 | Williams | 210/748 |
| 4,013,552 | 3/1977 | Kreuter | 210/748 |
| 4,076,617 | 2/1978 | Bybel et al. | 210/748 |
| 4,477,357 | 10/1984 | Sittenfield | 210/748 |
| 4,751,005 | 6/1988 | Mitsui et al. | 210/762 |
| 4,764,278 | 8/1988 | Chou et al. | 210/634 |
| 4,849,114 | 7/1989 | Zeff et al. | 210/760 |
| 4,857,204 | 8/1989 | Joklik | 210/764 |
| 4,861,484 | 8/1989 | Lichtin et al. | 210/748 |
| 4,863,608 | 9/1989 | Kawai et al. | 210/763 |
| 4,892,712 | 1/1990 | Robertson et al. | 210/748 |
| 4,906,387 | 3/1990 | Pisani | 210/748 |
| 4,990,260 | 2/1991 | Pisani | 210/748 |
| 5,026,484 | 6/1991 | Juvan | 210/748 |

FOREIGN PATENT DOCUMENTS

PH7074 7/1987 Australia .......................... 210/763

OTHER PUBLICATIONS

Barbeni, Massimo, et al., "Photodegradation of 4-Chlorophenol Catalyzed by Titanium Dioxide Particles", *Nouveau journal De Chimie*, vol. 8, 1984, pp. 547–550.

D'Oliveira, Jean-Christophe, et al., "Photodegradation of 2- and 3-Chlorophenol in TiO$_2$ Aqueous Suspensions", *Environ. Sci. Technol.*, vol. 24, No. 7, 1990, pp. 990–996.

Ollis, David F., "Contaminant Degradation in Water", *Environ. Sci. Technol.*, vol. 19, No. 6, 1985, pp. 480–484.

Sierka, Raymond A., et al., "Catalytic Effects of Ultraviolet Light and/or Ultrasound on the Ozone Oxidation of Humic Acid and Trihalomethane Precursors", *Ozone Science & Engineering*, vol. 7, 1985, pp. 47–62.

Zepp, Richard G., "Factors Affecting the Photochemical Treatment of Hazardous Waste", *Environ. Sci. Technol.*, vol. 22, No. 3, 1988, pp. 256–257.

*Primary Examiner*—Stanley S. Silverman
*Assistant Examiner*—Cynthia L. Nessler
*Attorney, Agent, or Firm*—John P. Taylor

[57] ABSTRACT

A process for efficiently removing halogenated organic compounds from contaminated aqueous liquids is described which comprises contacting the contaminated liquid with a photocatalyst while simultaneously exposing the contaminated liquid to both acoustic energy and light energy to efficiently decompose the halogenated organic compounds.

26 Claims, 4 Drawing Sheets

METHOD OF TREATING AQUEOUS LIQUIDS USING LIGHT ENERGY, ULTRASONIC ENERGY, AND A PHOTOCATALYST

BACKGROUND OF THE INVENTION

1. Field of the Invention

This invention relates to a method of treating an aqueous liquid containing halogenated organic impurities. More particularly, this invention relates to a method of treating an aqueous liquid containing halogenated organics using a combination of light energy and ultrasonic energy in the presence of a photocatalyst to decompose the halogenated organic impurities in the liquid.

2. Description of the Related Art

It is desirable to remove halogenated organic materials from aqueous liquids such as water containing chlorinated hydrocarbons, e.g., chlorinated phenols. Prior art removal techniques have included the use of ultraviolet light radiation to decompose halogenated organic compounds. For example, Chou et al. U.S. Pat. No. 4,764,278 discloses a method for reducing the concentration of haloorganic compounds in water by first extracting the haloorganic compounds from the water using a water immiscible alkane hydrocarbon solvent. The solvent is then separated from the water and regenerated by exposing the solvent to ultraviolet light to degrade the haloorganic compounds.

Ultraviolet light energy has also been used in combination with a photocatalyst, sometimes also referred to as a semiconductor photocatalyst, such as $TiO_2$, to remove halogenated organic materials from aqueous liquids by decomposure of the organic contaminant. For example, Barbeni et al., in "Photodegradation of 4-Chlorophenol Catalyzed by Titanium Dioxide Particles", Nouveau Journal de Chimie, Vol. 8, (1984), pp. 547-550, describes the decomposition of 4-chlorophenol in an aqueous solution containing a suspension of $TiO_2$ exposed to radiation of UV wavelength or sunlight to form $CO_2$ and HCl.

D'Oliveira et al., in "Photodegradation of 2- and 3-Chlorophenol in $TiO_2$ Aqueous Suspensions", Environ. Sci. Technol., Vol. 24, No. 7, (1990), pp. 990-996, discuss the use of $TiO_2$ in combination with radiation of >290 nm., and preferably >340 nm., to remove 2-chlorophenol and 3-chlorophenol.

Ollis, in "Contaminant Degradation in Water", Environ. Sci. Technol., Vol. 19, No. 6, (1985), pp. 480-484, discloses the removal of trichloromethane (chloroform) or ethylene dibromide from an aqueous solution by simultaneous presence of both $TiO_2$ and near-UV light of 300 nm. to <400 nm. In both cases, use of either the catalyst or the UV illumination alone did not produce the degradation.

Zepp, in "Factors Affecting the Photochemical Treatment of Hazardous Waste", Environ Sci. Technol., Vol. 22, No. 3, (1988), pp. 256-257, discusses various photoreactions, pointing out that direct photoreactions of ionizable compounds, such as chlorophenols, are often very sensitive to pH. He also observes that the combination of UV light and ozone is effective for oxidizing pollutants. He states that irradiated semiconductors are versatile reagents that show promise for treatment of hazardous wastes and that titanium dioxide has been shown to effectively photocatalyze the reduction of chlorinated organics.

Ultrasonic energy has also been used in the removal of halogenated organics from an aqueous liquid. For example, Sittenfield U.S. Pat. No. 4,477,357 describes a process for removal of contaminants such as halogenated organics from a liquid. Halogenated organic materials in oil or water are mixed with an equal amount of an alkaline agent, such as a hydroxide or a carbonate of an alkali metal or an alkaline earth metal, and then exposed to ultrasonic energy to decompose the halogenated organic contaminant. The presence of the alkaline agent is said to significantly accelerate the dehalogenation and decomposition of organic ring structures.

Sierka et al., in "Catalytic Effects Of Ultraviolet Light And/Or Ultrasound On The Ozone Oxidation Of Humic Acid and Trihalomethane Precursors", describe the catalytic effects of the use of both UV irradiation and ultrasound, either singly or in combination, on the ozone oxidation of organic materials, such as humic acid, in aqueous solutions. It is indicated that the most effective reactor conditions for both the destruction of nonvolatile total organic carbon and trihalomethane formation potential utilized both ultrasound and UV irradiation in combination with ozone.

While these methods have been shown to be successful in removing halogenated organic contaminants from aqueous liquids and decomposing such organic materials, usually the reaction times are sufficiently slow to reduce the economic attractiveness of such processes, especially for continuous or on line treatment systems.

SUMMARY OF THE INVENTION

It is, therefore, an object of this invention to provide an improved method for treating an aqueous liquid contaminated with one or more halogenated organic compounds which will rapidly decompose such halogenated organic contaminants.

It is another object of this invention to provide an improved method for treating an aqueous liquid contaminated with one or more halogenated organic compounds using a combination of exposure of the contaminated liquid to light energy and ultrasonic energy in the presence of a photocatalyst.

It is a further object of this invention to provide an improved method for treating an aqueous liquid contaminated with one or more halogenated organic compounds using a combination of exposure of the contaminated liquid to light energy and ultrasonic energy while contacting the contaminated liquid with a particulated photocatalyst.

It is a still another object of this invention to provide an improved method for treating an aqueous liquid contaminated with one or more halogenated organic compounds using a combination of exposure of the contaminated liquid to ultraviolet light energy and ultrasonic energy while contacting the contaminated liquid with a suspension of particulated photocatalyst.

These and other objects of the invention will be apparent from the following description and accompanying drawings.

DETAILED DESCRIPTION OF THE INVENTION

Figure 1:
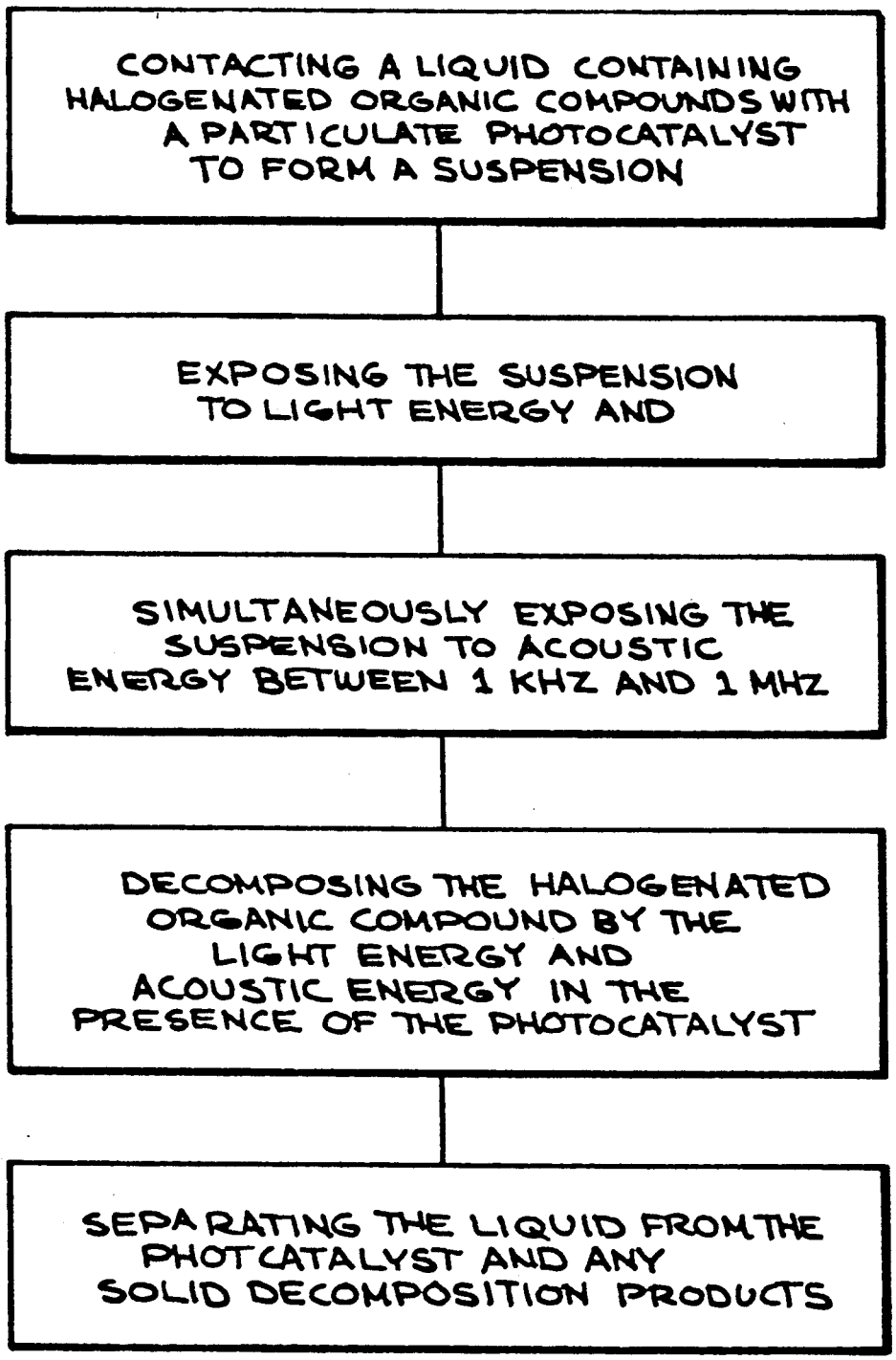
FIG. 1 is a flowsheet illustrating the process of the invention.

The invention provides a novel process for efficiently removing halogenated organic compounds from contaminated aqueous liquids by contacting the contaminated liquid with a particulated photocatalyst, while simultaneously exposing the contaminated liquid to acoustic energy and light energy to decompose the halogenated organic compounds.

Photocatalytic degradation requires a relatively inexpensive, safe, and nontoxic catalyst. It produces no toxic by products, can utilize concentrated solar energy to reduce light energy costs, exhibits reasonable yields, and is applicable to a wide variety of organic (many organics will react with hydroxyl radicals at appreciable rates).

When such catalytic degradation is combined with ultrasound, in accordance with the invention, the resulting process has the potential to offer improved rates and efficiencies (hence throughputs) under optimized conditions; the ability to use impure or cheaper forms of the photocatalyst; significant increases (as much as fivefold) in the degradation rate of aqueous organics without poisoning of the catalyst; improvements in conventional suspended catalyst separation methods such as ultrafiltration; and for applications involving treatment of waste water containing suspended solids, the use of sonication may also assist in the release of hydrophobic organics adsorbed on soil particles, for subsequent reaction at the photocatalyst surface.

Examples of photocatalyst materials which may be used in the practice of the invention include, for example, titanium dioxide ($TiO_2$), zinc oxide (ZnO), cadmium sulfide (CdS), iron oxide ($Fe_2O_3$), gallium phosphide (GaP), tin oxide ($SnO_2$), silicon carbide (SiC), and tungsten oxide ($WO_3$). By way of illustration, and not of limitation, the photocatalyst will be hereinafter referred to as a $TiO_2$ catalyst.

By use of the term "photocatalyst" is meant any compound in which irradiation of such compound with electromagnetic radiation of visible or ultraviolet wavelength will result in the generation of conduction band electrons ($e^-_{cb}$) and valence band holes ($h^+_{vb}$) that can then undergo redox reactions at the catalyst surface with species such as water or inorganic and organic compounds. The initiating step in this photocatalytic process requires illumination with light of energy higher than the band gap of the semiconductor photocatalyst (e.g., <380 nm. for anatase $TiO_2$, the most effective and widely studied photocatalyst). Electromagnetic radiation within a wavelength range of from about 250 nanometers (nm.) to about 450 nm. will usually have such an energy level.

While it is not desired to be bound by any theories of the mechanism of the degradation reaction, for degradation of organics in water, the reaction of adsorbed water with these electrons and holes to yield hydroxyl radicals OH and hydrogen radicals H is the generally accepted initial event in the degradation. The organic substrate degradation then occurs via reaction principally with hydroxyl radicals.

The photocatalyst used in the process is preferably a particulated photocatalyst which may be provided in a wide distribution of average particle sizes ranging from an average particle size of as small as, for example, from about 0.05 microns to as large as, for example, +5 mesh (Tyler), which is about 4,000 microns in diameter. Since large surface areas are desired for the photocatalyst to provide a large amount of active sites, small particles will be desired. It will be appreciated, however, that larger size particles could be used, i.e., particles larger than 4,000 micron in size.

The particulated photocatalyst, such as $TiO_2$, may be added in dry form to the contaminated liquid and mixed together to form a suspension prior to exposure of the contaminated liquid to the ultraviolet light and acoustic energy. Alternatively, the dry particulate catalyst may be premixed as a slurry or suspension with an aqueous liquid miscible with the contaminated liquid, and this premix may then be added to the contaminated liquid prior to exposure of the contaminated liquid to the ultraviolet light and acoustic energy. The photocatalyst may also be incorporated into an inert matrix such as, for example, by coating glass beads with the photocatalyst.

In either instance, the concentration of the particulate photocatalyst in the contaminated liquid should range from about 100 milligrams per liter of contaminated liquid to about 2 grams per liter of contaminated liquid. Higher concentrations may be used but are not deemed to be necessary and only would add expense to the process, both from the standpoint of additional material costs as well as additional processing costs, e.g., if the catalyst must be separated from the purified liquid after the halogenated organic compound has been decomposed.

Typically, the concentration of the photocatalyst in the contaminated liquid will be about 1 gram per liter. Lower concentrations may be used, but this may result in a lowering of the decomposition rate. In this regard, it will be appreciated that the actual amount of catalyst used will depend upon the surface area of the catalyst which will, in turn, depend upon the porosity and/or particle size of the particulate catalyst. A typical surface area range will be from about 1 to about 50 meter$^2$/gram of photocatalyst such as $TiO_2$.

It should be noted that it may be desirable to pretreat the photocatalyst, for example, by heating to greater than 400° C. under a reducing atmosphere, or by washing the catalyst with a concentrated acid, to enhance the efficiency of the photocatalyst.

As stated above, the electromagnetic radiation source should be a light source which provides energy higher than the band gap of the semiconductor catalyst. To accomplish this, the electromagnetic radiation or light source will be within the wavelength range of from about 250 nm. to about 450 nm. For a photocatalyst such as $TiO_2$, for example, the wavelength range will be from about 290 nm. to about 400 nm., and preferably from about 300 nm. to about 360 nm., i.e., an ultraviolet light source. The intensity of the light source will be inversely proportional to the amount of time which it will takes to affect the desired decomposure of the halogenated organic compounds, i.e., the weaker the light source, the longer the decomposure time will be. This, in turn, will affect the overall efficiency of the process and will be of particular importance when the process is being run on a continuous basis rather than as a batch operation.

For a light source which is coupled directly to an optical cell containing the contaminated liquid, the intensity of the light source, at the selected wavelength, e.g., 360 nm. for $TiO_2$, should be at least about 1,000 microwatts per $inch^2$ of exposure area per liter of liquid to achieve complete decomposure within a reasonable exposure period. Such light sources are commercially available, e.g., a mercury lamp source, or sunlight may be used as the source of light radiation of ultraviolet wavelength.

The distance that the light source is located from the liquid to be irradiated is important since much of the light energy may be absorbed within a few cm. of the liquid surface. Therefore, depending upon the size and geometry of the reaction vessel, as well as the intensity of the light source, it may be appropriate to use a plurality of such light sources dispersed around the perimeter of the vessel, as well as above and below the respective top and bottom surfaces of the vessel.

In general, it may be stated that the relationship of the intensity of the light source (or sources) to the dimensions of the reaction vessel should be such that the light entering the reaction vessel will still have sufficient intensity or energy to initiate photocatalytic decomposure of the organic material in the liquid when it reaches the farthest extremity of the volume of the vessel. For a single light source, for example, this would mean the opposite wall of the vessel. However, if a plurality of such light sources were to be spaced around the perimeter of the reaction vessel, this distance would mean the distance to the center of the vessel.

It should be noted in this regard that the decomposition rate will be dependent upon not only the intensity of the light source and the dimensions of the reaction vessel, but also on the type and concentration of catalyst, the intensity of the sonication source, and the type and concentration of the organic material being decomposed.

The acoustic energy is provided by one or more sonication apparatuses or acoustic generators operating at between from about 1 KHz to about 1 MHz, preferably from about 10 KHz to about 100 KHz, and most preferably about 20 KHz, at a power level which may be within a range of from about 10 watts to about 2,500 watts.

It should be noted here that such a power range will be dependent upon the size of the vessel into which the acoustic energy will be coupled. If the vessel is sufficiently large, it may be preferable to utilize more than one generator rather than increasing the power level of an individual generator to more than about 2,500 watts. A single acoustical generator having a power range of from about 10 to about 2,500 watts will usually provide sufficient power for a reaction vessel up to about 2 liters in volume. Thus, the total power range of the acoustical source may be expressed as a power range equivalent to from about 10 to about 2,500 watts for a 2 liter vessel.

The sonication apparatus is coupled, through an appropriate transducer or sonication tip, directly into the optical cell or vessel which contains the contaminated liquid. That is, the transducer or sonication tip is immersed directly in the liquid to be decomposed within the cell. Such an acoustic generator may comprise any commercially available apparatus capable of operating within these ranges such as, for example, Ultrasonic Processor W-2500, available from the Heat Systems Company.

It should be noted here that the intensity of the sonication, like the intensity of the light radiation, will be proportional to the distance of the liquid being acted upon from the transducer or sonication tip. Therefore, depending upon the size of the vessel, it may be preferable to utilize a plurality of transducers or sonication tips, with the power level of the sonication source adjusted accordingly, as well as using more than one acoustical generator as discussed above.

As in the previously discussed relationship between the intensity of the light source (or sources) to the dimensions of the reaction vessel, the power level of the sonication source (or sources) should be such that the acoustic energy imparted to the liquid in the reaction vessel will still have sufficient energy to accelerate photocatalytic decomposure of the organic material in the liquid when it reaches the farthest extremity of the volume of the vessel. This, for a single transducer or sonication tip immersed in the liquid, would mean the farthest point in the vessel from the location of the transducer or tip, i.e., probably the opposite wall of the vessel. However, if a plurality of such sonication tips were to be immersed in the liquid, for example, around the perimeter of the reaction vessel, this distance would mean the distance to the center of the vessel, as in the case of the use of multiple light sources.

While, as stated above, there is not the intention to be bound by theories of operation of the process of the invention, it is believed that by combining sonication and photocatalytic degradation, reaction enhancement is provided due to: cavitational effects which lead to dramatic increases in temperature and pressure at the localized microvoid implosion sites; cleaning or sweeping of the photocatalyst surface due to acoustic microstreaming which allows or provides more active sites; increased mass transport of reactants and products at the catalytic surface and in solution; increased photocatalyst surface area due to fragmentation or pitting of the photocatalyst particles by the sonication; cavitational inducement of radical intermediates which become involved in the destruction of the organic compounds; and reaction of the organic substrate directly with the photogenerated surface holes and electrons.

The halogenated organic compounds present in the contaminated liquid to be purified may comprise halogenated aromatic compounds such as, for example, chlorinated phenols (e.g., 2,4-dichlorophenol, 4-chlorophenol, pentachlorophenol), chlorinated biphenyls (e.g., 3-chlorobiphenyl and 4,4'-dichlorophenyl), brominated biphenyls, and halogenated benzene derivatives (e.g., chlorobenzene, 4-chlorotoluene, chlorinated dioxin, and halogenated benzofurans).

Examples of halogenated aliphatic organics include halogenated hydrocarbons such as fluoromethanes, ethanes, propanes, etc.; chloromethanes, ethanes, propanes, etc.; bromomethanes, ethanes, propanes, etc.; and mixtures of same; halogenated alkenes, such as trichloroethylene; halogenated alcohols, such as 1-chloro-2- propanol; halogenated ketones; halogenated aldehydes, such as aldrin aldehyde; halogenated carboxylic acids, such as trichloroacetic acid; and halogenated ethers, such as bis(2-chloroisopropyl)ether.

The concentration of such halogenated organic compounds in the aqueous liquid may range from as little as 2 ppm to as much as 2,000 ppm. After purification by the process of the invention, the concentration of such halogenated organic impurities in the previously contaminated liquid may be reduced to less than 1.0 ppm.

Exposure of the contaminated aqueous liquid containing such halogenated organic compounds to both UV radiation and acoustic energy, in the presence of the particulated $TiO_2$ catalyst, results in decomposure of the halogenated organic compounds into HX (where X is the particular halogen) and $CO_2$ gases, which may then be subsequently removed from the liquid. A separate source of oxygen is usually not necessary for the formation of the $CO_2$ decomposition product, since there will normally be sufficient dissolved oxygen in the aqueous liquid. However, a separate source of oxygen may be optionally provided if desired, which could be introduced into the contaminated liquid through a sparger ring or the like.

Figure 2:
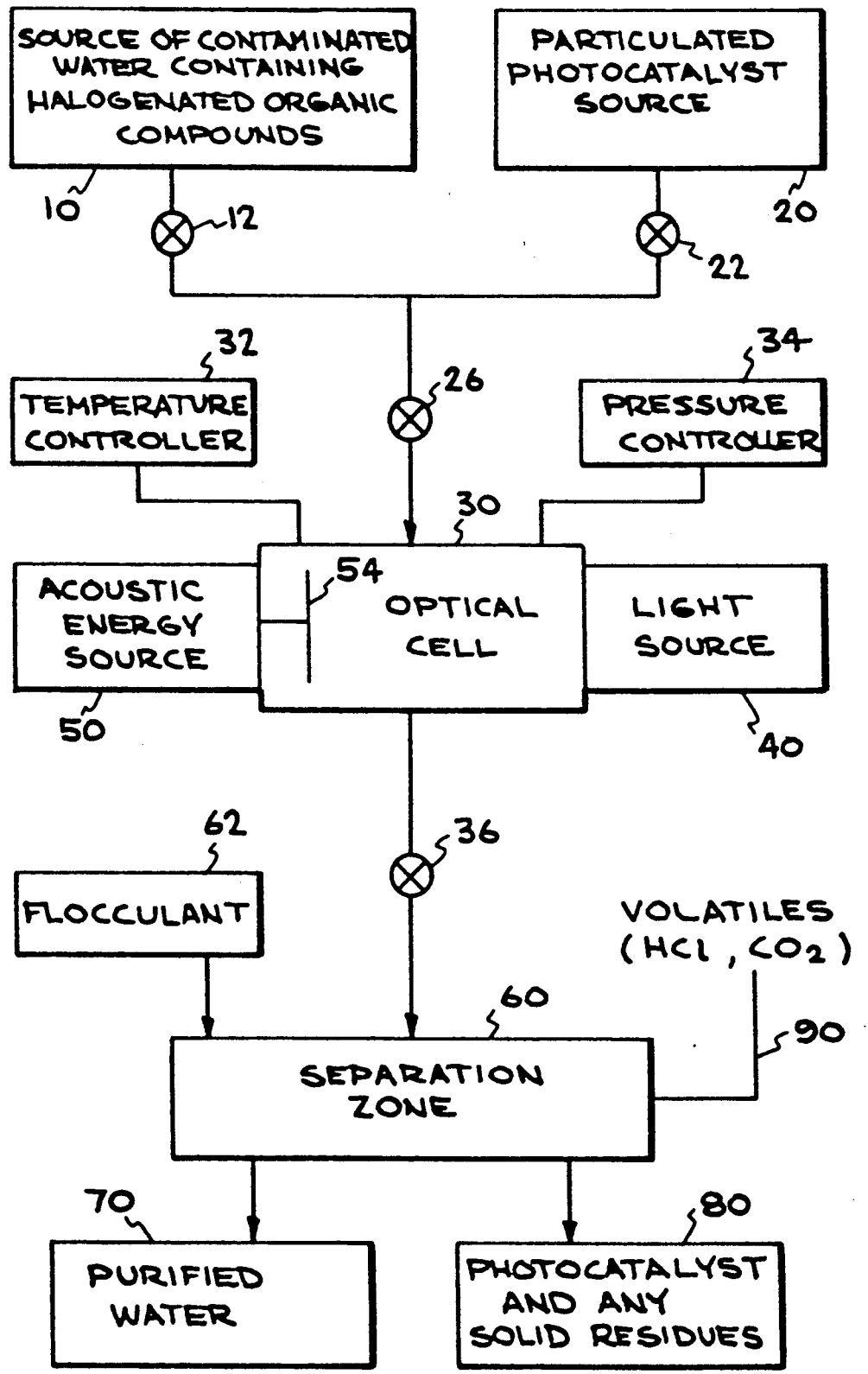
FIG. 2 is a diagrammatic layout of typical apparatus which may be used in carrying out the method of the invention.

Turning now to FIG. 2, the process of the invention is schematically illustrated. A contaminated liquid source 10 such as water containing halogenated organic contaminants, in a concentration which may range from about 2 ppm to about 2,000 ppm, is mixed with a source of particulated $TiO_2$ catalyst 20 which may be in dry form or, preferably, in a previously formed suspension or slurry. The amounts of each source may be adjusted, respectively, through valves 12 and 22 to adjust the proportions to provide the desired concentration range of from about 100 milligrams to about 2 grams of catalyst per liter of contaminated liquid flowing through valve 26 into optical cell 30.

Optical cell 30 may comprise any reaction vessel having sidewalls (or one or more openings in the sidewalls) transparent to electromagnetic radiation, e.g., UV light radiation of from about 300 nm. to about 360 nm. for a $TiO_2$ photocatalyst, to permit the liquid in optical cell 30 to be irradiated by light energy from a light source 40 which is preferably coupled directly to the sidewall of cell 30 to permit the most efficient coupling of the light energy to cell 30 from source 40. While FIG. 2 illustrates light source 40 as a single source, it will be readily appreciated that the light energy may be passed through the transparent sidewalls or windows through a plurality of such light sources arranged around the periphery of optical cell 30, as previously discussed, to uniformly illuminate the liquid therein with light of the proper wavelength during the decomposure of the halogenated organic compounds in the contaminated liquid in cell 30.

Also mounted on the sidewall of optical cell 30 is an acoustic energy source 50 which provides acoustic energy to the contaminated liquid in cell 30 simultaneous with irradiation of the liquid with the light source through a transducer 54 immersed in the contaminated liquid in cell 30.

The dimensions of cell 30 are selected, with respect to the location and energy levels of the light and acoustical energy sources, so that all of the liquid in cell 30 will be exposed to both light energy and acoustical energy at an energy level sufficient to cause decomposure of the halogenated organic molecules in the liquid.

Cell 30 may be further provided with temperature controlling means 32 to maintain the liquid being treated within cell 30 within a temperature range of from about 15° C. to about 60° C. Pressure control means 34 may also be provided to increase the hydrostatic pressure within cell 30 from atmospheric pressure up to a pressure of about 500 psi.

The halogenated organic compounds in the aqueous liquid decompose in optical cell 30 upon exposure to both the light radiation and acoustic energy in the presence of the particulated photocatalyst. Because of the synergistic effect of exposing the halogenated organic compounds to both of said energy sources in the presence of the photocatalyst, the compounds quickly break down at a rate faster than when each energy source is used alone, although it will be appreciated that this rate will be dependent upon the cell volume of contaminated liquid being treated, the type of contaminated liquid, the intensity of the light and ultrasound energy sources and, when the process is being run on a continuous basis, the throughput or flow rate of the contaminated liquid through the cell.

After decomposure of the halogenated organic contaminants in the liquid, the liquid passes out of cell 30 through valve 36 to a separation zone 60 wherein the catalyst and any other solid residues which may remain from the decomposed organic compounds may be separated from the liquid, by any suitable separation means, which may, for example, include the addition of a flocculating agent, as shown at 62. Such separation means can include, for example, filtration, centrifugation, or settling.

The now purified liquid then flows into a reservoir 70, while the solid residues or sludge passes into a receptacle 80, from which the photocatalyst may be later either completely or partially recovered and recycled if desired. Volatile gases from the decomposition step, such as HCl and $CO_2$, may be removed from the apparatus at exhaust port 90.

When it is desired to operate the process as a batch process, valve 26 may be opened to fill optical cell 30 while drain valve 36 is closed. If the process is to be operated on a continuous basis, valves 26 and 36 are both opened and adjusted to provide the same amount of flow into and out of optical cell 30.

As an example of the operation of the process of the invention as a batch process, when optical cell 30 has a volume of about 25 liters, the process can be successfully operated by exposing the contaminated liquid, e.g., an aqueous liquid contaminated with 2,4-dichlorophenol, to both the light radiation and the acoustic energy for a period of 20 minutes with the intensity of light source 40 (within the 300-360 nm. range) maintained at about at least 10 milliwatts/$cm^2$, and acoustic source 50 maintained at a power level of at least about 500 watts within the previously recited frequency range, in the presence of about 25 grams of a photocatalyst such as $TiO_2$, to provide a purified liquid having a level of halogenated organic impurities of less than about 1.0 ppm.

The following examples will serve to further illustrate the practice of the process of the invention:

EXAMPLE I

About 25-30 ml. of a contaminated aqueous solution containing $9 \times 10^{-4}$ molar 2,4-dichlorophenol was placed in a 40 ml cylindrical jacketed glass cell having about a 3 cm. inner diameter. A sufficient amount of particulated titanium dioxide (Degussa P25, anatase), having a particle size of about 2 microns, was added to provide a concentration of about 0.2 weight percent of catalyst, based on total weight of the solution, including the catalyst.

The cell was irradiated by a Blak-Ray B-100A 100 watt mercury bulb ultraviolet light source having a nominal intensity of 7,000 microwatts/cm.$^2$ at 350 nm. and which was positioned 5 inches from the outer jacket wall of the cell. The solution was sonicated using a $\frac{1}{2}$" titanium horn immersed 1 cm. into the solution in the cell and powered by a Heat Systems XL2020 475 watt ultrasonic processor. The amplitude of the ultrasonic vibration at the tip of the horn was set to the maximum value of 120 micrometers, which for this bell and contents required an output power of approximately 130 watts.

Figure 3:
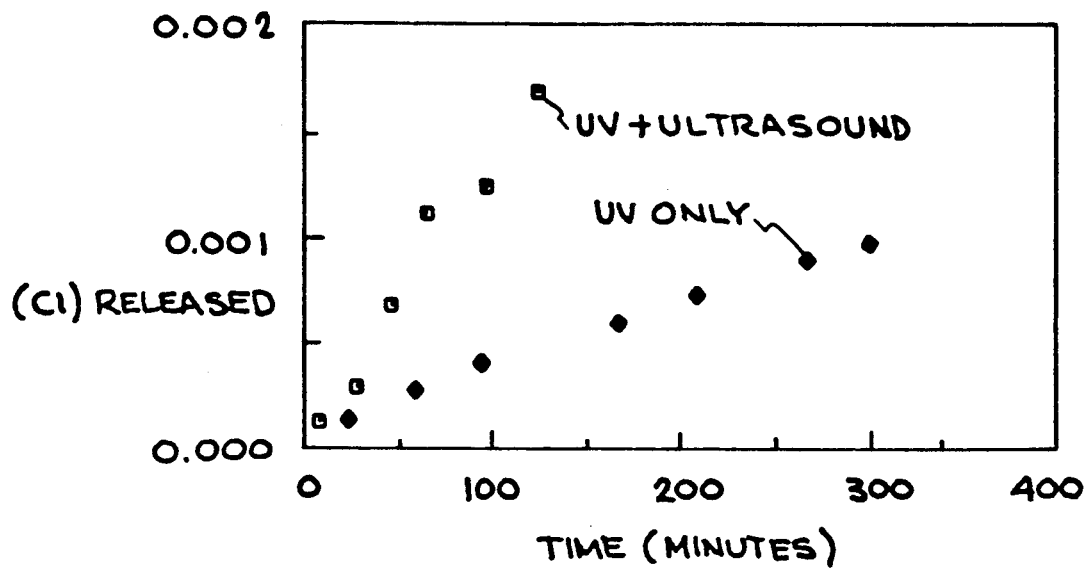
FIG. 3 is a graph showing the purification of a contaminated aqueous liquid containing 2,4-dichlorophenol with and without the use of ultrasound in combination with UV light.

During the sonication and photolysis, the cell was water cooled to maintain the solution temperature at 35° C. After sonication and photolysis, the sample was analyzed for chloride ion production by means of a chloride ion selective electrode, and for the disappearance of the particular chlorinated compound by UV/visible spectrophotometric analysis after filtration through a 0.20 micron Teflon filter. A second sample of the same contaminated liquid was also treated in the same manner except that no ultrasound was used. The results are shown in the graph of FIG. 3 wherein the amount of chlorine released is shown plotted against time. The graph shows the marked improvement in removal of chlorine from the solution when both UV light irradiation and ultrasound are used in combination with the photocatalyst, with complete destruction of the 2,4-dichlorophenol within 120 minutes using both ultrasound and UV light in contrast to destruction of only about 25% of the chlorinated phenol when UV light radiation was used without ultrasound. When ultrasound was used without UV light, it had no effect on the degradation of the chlorinated phenol.

EXAMPLE II

Figure 4:
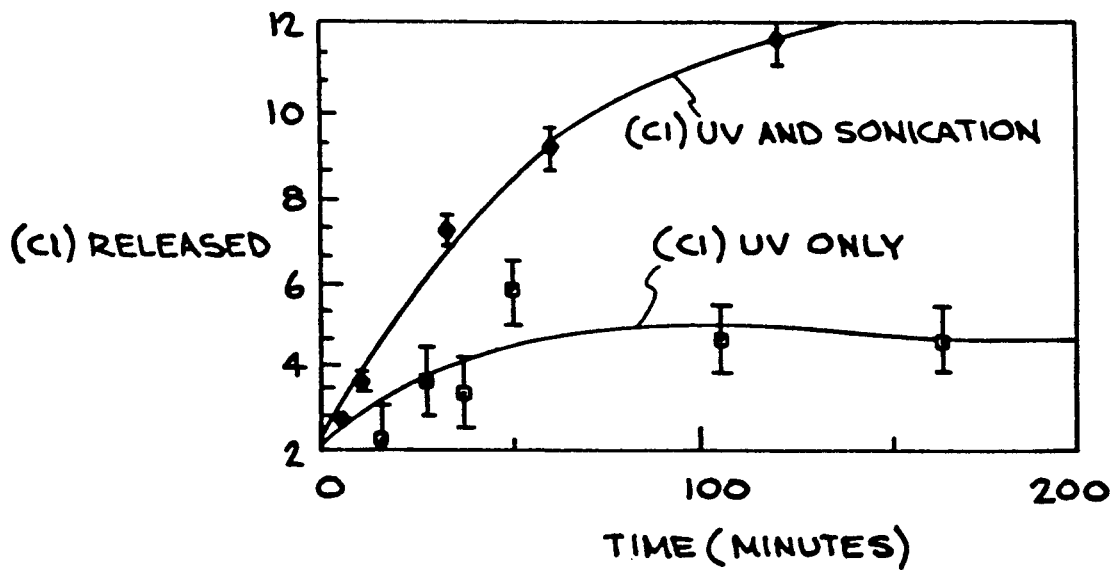
FIG. 4 is a graph showing the purification of a contaminated aqueous liquid containing pentachlorophenol with and without the use of ultrasound in combination with UV light.

Several contaminated water samples containing a 2.5 millimolar concentration of pentachlorophenol were treated in the same manner as the samples treated in Example I. As shown in the graph of FIG. 4, when the sample was exposed to both UV light and ultrasound, rapid and quantitative destruction of the pentachlorophenol was noted within 2 hours, whereas the use of UV light without ultrasound resulted in a slower initial rate of destruction of the pentachlorophenol and a maximum degradation efficiency of only about 30%.

EXAMPLE III

Figure 5:
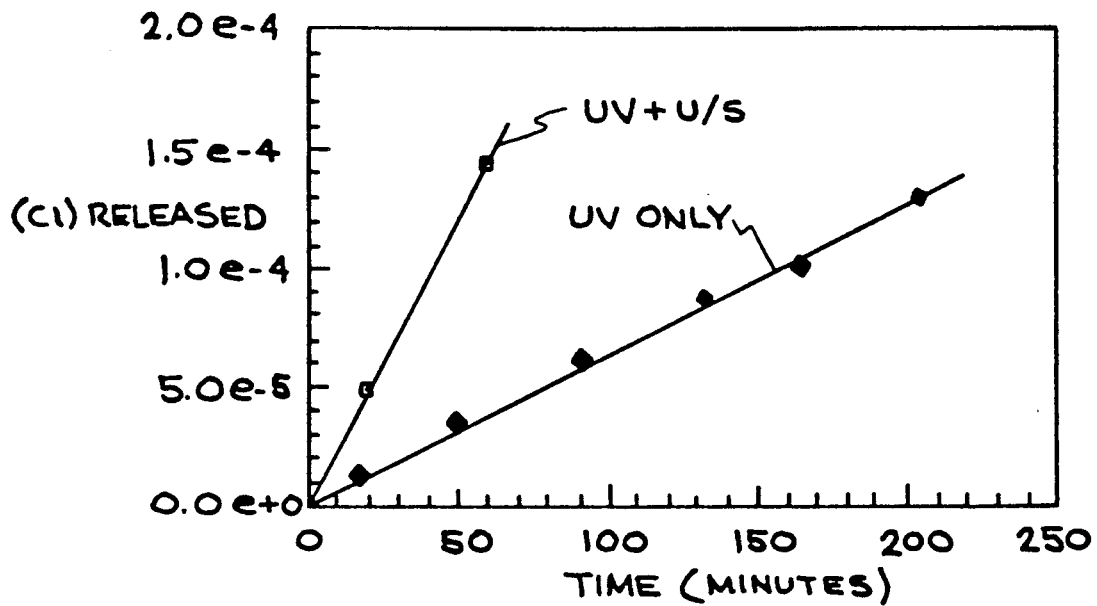
FIG. 5 is a graph plotting the decomposition of 3-chlorobiphenyl in an aqueous liquid against time using a $TiO_2$ photocatalyst with both ultraviolet light and ultrasound and with only ultraviolet light.

To an aqueous solution containing about 75 ppm $(4 \times 10^{-4}M)$ of 3-chlorobiphenyl was added sufficient particulated TiO$_2$, as described in Example I, to provide a concentration of 0.2 wt. %, based on total weight of the solution. 30 ml. aliquots of this solution containing the photocatalyst were then respectively subjected to UV light irradiation alone, and combined UV light and ultrasound irradiation, in the same manner as previously described in Example I. The results are shown in the graph of FIG. 5. The rate of appearance of chloride (decomposition of the organic compound) was fairly linear over time for both treatments. However, it can be seen that the rate using the combination of UV light and sonication was approximately 3 times greater than without sonication.

EXAMPLE IV

Figure 6:
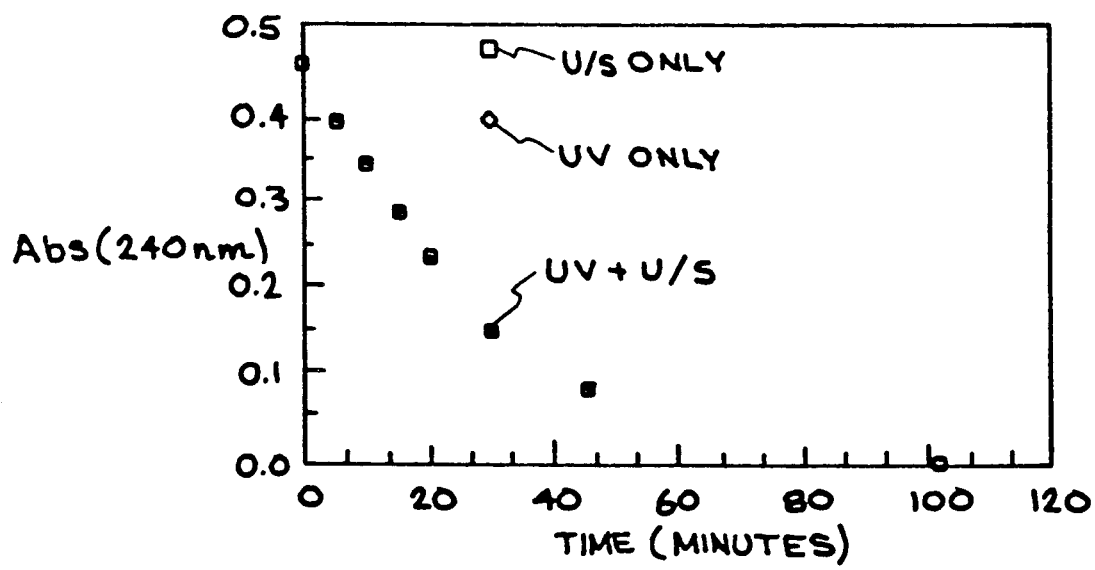
FIG. 6 is a graph plotting the absorption of light at 240 nm. by 4-chlorophenol against time using a ZnO photocatalyst with both ultraviolet light and ultrasound, as well as with only ultrasound, and with only ultraviolet light.

Several contaminated water samples containing 0.001 molar 4-chlorophenol were treated in the same manner as the samples in Example I, except that zinc oxide was used as the photocatalyst. The results are shown in the graph of FIG. 6, which plots the absorbance by 4-chlorophenol of light at 240 nm. against time. As shown in the graph of FIG. 6, when the sample was exposed to both UV light and ultrasound, rapid destruction of the 4-chlorophenol was noted and complete degradation occurred within about 100 minutes. The use of only UV light in the presence of the zinc oxide photocatalyst resulted in a much slower rate of degradation, while the use of ultrasound alone, i.e. without UV light, did not result in any appreciable degradation of the 4-chlorophenol in the sample. Similar results can be obtained using cadmium sulfide, tungsten oxide, iron oxide, gallium phosphide, tin oxide, or silicon carbide as the photocatalyst.

Thus, the invention provides an improved process for the removal of halogenated organic impurities from an aqueous liquid by the simultaneous exposure of the contaminated liquid to both light radiation and acoustic energy in the presence of a photocatalyst to cause the efficient decomposure of the halogenated organic compounds in the contaminated liquid.

Having thus described the invention what is claimed is:

1. A process for the treatment of an aqueous liquid containing a halogenated organic compound which consists of:
    a) contacting the aqueous liquid with a semiconductor photocatalyst while;
    b) irradiating the aqueous liquid with light of a wavelength higher than the band gap of the semiconductor photocatalyst; and
    c) simultaneously exposing the aqueous liquid to acoustical energy.

2. The process of claim 1 wherein said treatment decomposes said halogenated organic compounds by a combination of said light radiation, said acoustical energy, and said photocatalyst, and wherein said photocatalyst is a particulated photocatalyst.

3. The process of claim 2 wherein said liquid is irradiated with light of wavelengths ranging from about 250 to about 450 nm.

4. The process of claim 3 wherein said liquid is irradiated with UV light of wavelengths ranging from about 290 to about 380 nm.

5. The process of claim 4 wherein said UV wavelengths range from about 300 to about 360 nm.

6. The process for the treatment of an aqueous liquid containing a halogenated organic compound to decompose said halogenated organic compound which consists of:
    a) contacting said aqueous liquid with a photocatalyst while;
    b) irradiating the aqueous liquid with light of a wavelength ranging from about 250 to about 450 nm; and
    c) simultaneously exposing said aqueous liquid to acoustical energy.

7. The process of claim 6 wherein said photocatalyst is a particulated photocatalyst selected from the group consisting of titanium dioxide, zinc oxide, cadmium sulfide, iron oxide, gallium phosphide, tin oxide, silicon carbide, and tungsten oxide.

8. The process of claim 6 wherein said photocatalyst is a particulated photocatalyst selected from the group consisting of titanium dioxide, zinc oxide, cadmium sulfide, and tungsten oxide.

9. The process of claim 6 wherein said particulated photocatalyst contacts said liquid with a sufficient amount of said photocatalyst to form a suspension having a concentration of from about 100 milligrams to about 2 grams per liter of said liquid.

10. The process of claim 6 wherein the average particle size of said photocatalyst ranges from about 0.05 to about 4,000 microns.

11. The process of claim 6 wherein the intensity level of said light irradiating said liquid is at least about 1,000 microwatts/in$^2$ of exposure area per liter of liquid.

12. The process of claim 6 wherein the power level of said acoustical energy is equivalent to a range of from about 10 to about 2,500 watts for a 2 liter vessel.

13. The process of claim 6 wherein said photocatalyst is a semiconductor photocatalyst.

14. The process of claim 13 wherein said liquid is irradiated with light of energy higher than the band gap of said semiconductor photocatalyst.

15. The process of claim 6 wherein said acoustical energy ranges from about 1 KHz to about 1 MHz.

16. The process of claim 13 wherein said acoustical energy ranges from about 10 KHz to about 100 KHz.

17. A process for the treatment of an aqueous liquid containing a halogenated organic compound to decompose said halogenated organic compound which consists of:
   a) contacting said aqueous liquid with a particulated photocatalyst while;
   b) irradiating the aqueous liquid with light of a wavelength ranging from about 250 to about 450 nm while;
   c) simultaneously exposing said aqueous liquid to acoustical energy; and
   d) separating said liquid from said particulated photocatalyst and from residues remaining after decomposure of said halogenated organic contaminants.

18. The process of claim 17 wherein said liquid is separated from said particulated photocatalyst and residues by filtration.

19. The process of claim 17 wherein said liquid is separated from said particulated photocatalyst and residues by settling.

20. The process of claim 17 wherein said liquid is separated from said particulated photocatalyst and residues by centrifugation.

21. A process for purifying an aqueous liquid containing halogenated organic contaminants by decomposing said contaminants which consists of:
   a) mixing said liquid with a particulate photocatalyst to form a suspension of said particulate photocatalyst and said liquid having a concentration of from about 100 milligrams to about 2 grams of said photocatalyst per liter of liquid;
   b) exposing said suspension to light radiation of energy higher than the band gap of said photocatalyst;
   c) simultaneously exposing said suspension to ultrasonic energy within a range of from about 1 KHz to about 1 MHz at a power level equivalent to a range of from about 10 to about 2,500 watts for a 2 liter vessel; and
   d) separating said liquid from said particulated photocatalyst after decomposure of said halogenated organic contaminants.

22. The process of claim 21 wherein the average particle size of said particulated photocatalyst ranges from about 0.05 to about 4,000 microns.

23. The process of claim 21 wherein said photocatalyst is selected from the group consisting of titanium dioxide, zinc oxide, cadmium sulfide, iron oxide, gallium phosphide, tin oxide, silicon carbide, and tungsten oxide.

24. A process for purifying water containing halogenated organic contaminants by decomposing said contaminants which consists of:
   a) mixing said liquid with a particulate photocatalyst having a particle size range of from about 0.05 to about 4,000 microns to form a suspension of said particulate photocatalyst and said liquid having a concentration of from about 100 milligrams to about 2 grams of said photocatalyst per liter of liquid;
   b) passing said suspension through an optical cell to expose said suspension to light radiation having a wavelength range of from about 250 to about 450 nm at an energy density level of at least about 1,000 microwatts/in$^2$ of exposure area per liter of liquid;
   c) simultaneously exposing said suspension flowing through said optical cell to ultrasonic energy within a range of from about 1 KHz to about 1 MHz at a power level equivalent to a range of from about 10 to about 2,500 watts for a 2 liter vessel; and
   d) separating said particulated photocatalyst and decomposition products of said halogenated organic contaminants from said liquid.

25. The process of claim 24 wherein said photocatalyst is selected from the group consisting of titanium dioxide, zinc oxide, cadmium sulfide, and tungsten oxide.

26. A process for purifying contaminated water containing halogenated organic contaminants by decomposing said contaminants which consists of:
   a) mixing said contaminated water with particulate $TiO_2$ having a particle size range of from about 0.05 to about 4,000 microns to form a suspension of said particulate $TiO_2$ and said water having a concentration of from about 100 milligrams to about 2 grams of said $TiO_2$ per liter of contaminated water;
   b) passing said suspension through an optical cell to expose said suspension to ultraviolet light radiation of from about 300 to about 360 nm at an energy density level of at least about 1,000 microwatts/in$^2$ of exposure area per liter of liquid;
   c) simultaneously exposing said suspension flowing through said optical cell to ultrasonic energy within a range of from about 1 KHz to about 1 MHz at a power level equivalent to a range of from about 10 to about 2,500 watts for a 2 liter vessel; and
   d) separating said particulated $TiO_2$ photocatalyst and decomposition products of said halogenated organic contaminants from said liquid.

* * * * *